(12) United States Patent
Mellergård et al.

(10) Patent No.: US 12,179,844 B2
(45) Date of Patent: Dec. 31, 2024

(54) HOOD LIFTING MECHANISM, VEHICLE COMPRISING THE SAME AND METHOD FOR MOVING A HOOD

(71) Applicant: Volvo Car Corporation, Gothenburg (SE)

(72) Inventors: Edvin Mellergård, Gothenburg (SE); Eric Löfstedt, Gothenburg (SE); Miriam Tonbring, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 321 days.

(21) Appl. No.: 17/899,697

(22) Filed: Aug. 31, 2022

(65) Prior Publication Data
US 2023/0060547 A1    Mar. 2, 2023

(30) Foreign Application Priority Data
Sep. 2, 2021 (EP) .................................. 21194638

(51) Int. Cl.
*B62D 25/12* (2006.01)
*B60R 21/38* (2011.01)
*B62D 25/08* (2006.01)

(52) U.S. Cl.
CPC .............. *B62D 25/12* (2013.01); *B60R 21/38* (2013.01); *B62D 25/087* (2013.01); *E05Y 2900/536* (2013.01)

(58) Field of Classification Search
CPC .... B62D 25/12; B62D 25/087; B62D 25/105; B60R 21/38; E05Y 2900/536
See application file for complete search history.

(56) References Cited

U.S. PATENT DOCUMENTS

| 7,392,876 B2 * | 7/2008 | Browne | .................. B60R 21/38 296/193.11 |
| 7,823,682 B2 * | 11/2010 | Browne | .................. E05B 77/08 180/274 |

(Continued)

FOREIGN PATENT DOCUMENTS

| DE | 102019108937 A1 * | 10/2020 | ......... B60R 13/0838 |
| DE | 102019125586 A1 | 3/2021 | |

(Continued)

OTHER PUBLICATIONS

Feb. 16, 2022 European Search Report issued in International Application No. 21194638.

*Primary Examiner* — Lori Lyjak
(74) *Attorney, Agent, or Firm* — Clements Bernard Walker; Christopher L. Bernard

(57) ABSTRACT

A hood lifting mechanism for a vehicle having a frunk, including: at least one lifting mechanism configured to lift a hood, and a deformable material configured to be attached to an inner surface of the hood, wherein the deformable material is configured to switch from a first position (P1) in which the deformable material is either flat or forms a dome being directed towards the inner surface of the hood into a second position (P2) in which the deformable material forms a dome being directed towards the frunk when the at least one lifting mechanism is activated. Further, the present disclosure relates to a vehicle including such lifting mechanism and to a method for moving a hood of a vehicle.

14 Claims, 2 Drawing Sheets

(56) References Cited

U.S. PATENT DOCUMENTS

| | | | |
|---|---|---|---|
| 8,052,198 B2 * | 11/2011 | Seksaria | B62D 25/105 296/193.11 |
| 10,246,044 B2 * | 4/2019 | Barbat | B60R 21/36 |
| 10,800,458 B2 * | 10/2020 | Makowski | B60J 10/86 |
| 2006/0028051 A1 | 2/2006 | Brei et al. | |
| 2007/0068721 A1 * | 3/2007 | Browne | B60R 21/38 180/274 |
| 2020/0181954 A1 * | 6/2020 | Hwang | B62D 25/12 |
| 2020/0262482 A1 | 8/2020 | Makowski et al. | |
| 2022/0009419 A1 * | 1/2022 | Kim | B62D 25/12 |
| 2022/0048577 A1 * | 2/2022 | Glickman | B62D 25/105 |
| 2022/0105989 A1 * | 4/2022 | Cote | B62D 25/12 |
| 2022/0227299 A1 * | 7/2022 | Gombert | B60R 5/02 |
| 2022/0355738 A1 * | 11/2022 | Gill | B60R 19/52 |

FOREIGN PATENT DOCUMENTS

| | | | | |
|---|---|---|---|---|
| EP | 3569450 | A1 * | 11/2019 | B60R 13/011 |
| KR | 102273991 | B1 * | 7/2021 | |

* cited by examiner

HOOD LIFTING MECHANISM, VEHICLE COMPRISING THE SAME AND METHOD FOR MOVING A HOOD

CROSS-REFERENCE TO RELATED APPLICATION

The present disclosure claims the benefit of priority of co-pending European Patent Application No. 21 194 638.9, filed on Sep. 2, 2021, and entitled "HOOD LIFTING MECHANISM, VEHICLE COMPRISING THE SAME AND METHOD FOR MOVING A HOOD," the contents of which are incorporated in full by reference herein.

TECHNICAL FIELD

The present disclosure relates to a hood lifting mechanism, a vehicle including a hood lifting mechanism, and a method for moving, particularly lifting, a hood of a vehicle. In particular, the present disclosure relates to a front hood lifting mechanism for a vehicle having a frunk, a vehicle having a frunk and including a front hood lifting mechanism and a method for moving a front hood of a vehicle having a frunk.

BACKGROUND

In vehicles having a front trunk of a front luggage compartment, also referred to as frunk, a contact area, particularly a closing area, between the frunk and a hood of the vehicle needs to be sealed, when the frunk is closed by the hood. Therefore, when opening the hood, an under-pressure is created inside the frunk. Such under-pressure reduces the opening speed of the hood compared to an opening speed under normal pressure.

SUMMARY

There may, therefore, be a need to provide an improved hood lifting mechanism and a method for moving a hood of a vehicle, particularly a frunk lifting mechanism and a method for moving a frunk of a vehicle capable of reducing, preferably preventing, the under-pressure being caused inside the frunk, when opening the hood.

According to a first aspect of the present disclosure, there is provided a hood lifting mechanism, particularly a front hood mechanism, for a vehicle having a frunk. The mechanism includes at least one lifting means and a deformable material. The lifting means is configured to lift the front hood, e.g. in case of a collision with a pedestrian, particularly to create a damping space reducing the resulting forces acting on a pedestrian. The deformable material is configured to be attached to an inner surface of the hood. Further, the deformable material is configured to switch from a first position, in which the dome material is either flat or forms a dome being directed towards the inner surface of the hood, into a second position, in which the deformable material forms a dome being directed towards the frunk.

The deformable material may be configured to be switchable between those positions several times. Alternatively, the deformable material may be configured to be switchable from the first position into the second position only once. In other words, the deformable material may be either a material configured to deform elastically to be switchable between the first and second positions several times or a material configured to deform permanently to be switchable from the first position into the second position only once.

The dome of the deformable material may be formed by a 3D-shape holding the deformable material in this position. Alternatively, the dome of the deformable material may be formed by detachably fixing a part of the deformable material, such as a tip, a center or the like, to the inner hood, such that the part of the deformable material will detach, when switching positions, namely, when inverting. For example, a clip, a hook, or the like may be used to detachably fix the part of the deformable material to the inner hood.

In a closed position, the hood substantially contacts the frunk, wherein a contact area between the hood and the frunk is configured to prevent the entry of water, dust, dirt, etc., into the frunk. The contact area may be formed as a labyrinth of e.g. ribs being alternately arranged, to prevent water, dust, dirt etc. to come through. Additionally, or alternatively, the contact area may be sealed by a sealing. Particularly, when lifting the hood fast, e.g. when the at least one lifting means is activated, a lower air pressure is created inside the frunk than on top of the hood or even in the surrounding area under the hood. This lower air pressure, herein also referred to as under-pressure, acts as a force in a direction substantially opposite to the direction of a lifting force generated by the at least one lifting means.

By switching the deformable material into the second position, when the at least one lifting means is activated, a volume of the frunk is reduced. Thereby, the under-pressure is reduced, which is created inside the frunk, particularly during an initial lifting movement of the hood. The initial lifting movement describes a movement of the hood until a sealing stops sealing the contact area between the hood and the frunk and air can start to flow into the frunk. By reducing the under-pressure, an opening speed of the hood is increased. The opening speed of the hood is important, particularly with regard to active safety systems for vehicles.

Further, the lifting mechanism may further include at least on lifting means. The at least one lifting means may be configured to lift the front hood, preferably in case of a collision with a pedestrian, particularly to create a damping space reducing the resulting forces acting on a pedestrian. Further, the lifting means may be a pyro configured to generate a force for moving the hood up.

Pyros may create a large lifting force within a very short time span. One can say that, upon activation, a pyro explosively generates a large lifting force being able to move the hood upwards.

Further, the deformable material may be attached to a frame, the frame being configured to be attached to the inner surface of the front hood.

By attaching the deformable material to a frame, it may be easily assembled and/or retrofitted to the hood. Additionally, the frame may keep the deformable material in form. Further, the frame may be configured to hold a sealing for sealing the contact area between the hood and the frunk in the closed position. Alternatively, the deformable material may be attached directly to the hood. Further, alternatively, the deformable material may be integrally formed with the inner hood. For example, the deformable material may be a non-bearing part of the inner hood itself that can flex or invert.

The deformable material may be made of plastic, rubber and/or fabric. Further, the deformable material may be any material having at least the capability of switching from the first position into the second position. This means, the deformable material may have the capability of providing at least two stable positions. For example, in the first position, the deformable material may be flat or dome-shaped into a first direction, and in the second position, the deformable material may be dome-shaped into a second direction opposite to the first direction. Thus, the deformable material may be able to invert its form. Alternatively, the deformable material may be an elastic material, which may be stretched into the first position and detachably hold in the first position, e.g. by a mechanical attachment, like a snap-hook or the like. Further, such deformable material may be stretched into the second position by the force resulting from the under-pressure.

In some embodiments, the frame may be made of plastic. Manufacturing costs of a plastic frame are low. Further, plastics are light-weight materials compared to e.g. metal, and easy to process. Thus, the frame does not substantially contribute to the total weight of the hood and/or the vehicle. However, also any other, particularly light-weight, material may be used for the frame.

According to a second aspect, there is provided a vehicle including a frunk. The vehicle further includes a hood, particularly a front hood, at least one lifting means configured to lift the hood, and a deformable material. The hood is configured to close and seal the frunk in a closed position of the hood. The deformable material is attached to an inner surface of the front hood. Further, the deformable material is configured to switch, or be switchable, between a first position and a second position. The first position is a position, in which the deformable material is either flat or forms a dome being directed towards the inner surface of the hood, and the second position is a position, in which the deformable material forms a dome being directed towards the frunk.

In a closed position, the hood contacts the frunk, wherein a contact area between the hood and the frunk is sealed to prevent the entry of water, and/or, and/or dust, dirt, etc., into the frunk. Particularly, when lifting the hood fast, a lower air pressure is created inside the frunk than on top of the hood or even in the surrounding area under the hood. This lower air pressure, herein also referred to as under-pressure, acts as a force in a direction substantially opposite to the opening direction of the hood.

By switching the deformable material into the second position, when the hood is lifted, a volume of the frunk is reduced. Thereby, the under-pressure is reduced, which is created inside the frunk, particularly during an initial lifting movement of the hood. The initial lifting movement describes a movement of the hood until a sealing stops sealing the contact area between the hood and the frunk and air can start to flow into the frunk. By reducing the under-pressure, an opening speed of the hood is increased. The opening speed of the hood is important, particularly with regard to active safety systems for vehicles.

In some embodiments, the at least one lifting means may be configured to lift the hood from the frunk. The at least one lifting means may be a pyro configured to generated a force for moving the hood up.

Pyros may create a large lifting force within a very short time span. One can say that, upon activation, a pyro explosively generates a large lifting force being able to move the hood upwards.

Further, the deformable material may be attached to a frame being attached to the inner surface of the hood. By attaching the deformable material to a frame, it may be easily retrofitted to an already existing hood. Additionally, the frame may keep the deformable material in form. Alternatively, the deformable material may be attached directly to the hood. Further, alternatively, the deformable material may be integrally formed with the inner hood. For example, the deformable material may be a non-bearing part of the inner hood itself that can flex or invert.

Moreover, the frame may be made of plastic. Manufacturing costs of a plastic frame are low. Further, plastics are light-weight materials compared to e.g. metal, and easy to process. Thus, the frame does not substantially contribute to the total weight of the hood and/or the vehicle. However, also any other, particularly light-weight, material may be used for the frame.

The frame may further include a sealing configured to seal a contact, particularly a contact area between the hood and the frunk in the closed position.

The deformable material may be made of plastic, rubber and/or fabric. Alternatively, the deformable material may be made of a metal or any other material that may be perceived as "stiff". In other words, the deformable material may be any material having at least the capability of switching from the first position into the second position. This means, the deformable material may have the capability of providing at least two stable positions. For example, in the first position, the deformable material may be flat or dome-shaped into a first direction, and in the second position, the deformable material may be dome-shaped into a second direction opposite to the first direction. Thus, the deformable material may be able to invert its form. Alternatively, the deformable material may be an elastic material, which may be stretched into the first position and detachably hold in the first position, e.g. by a mechanical attachment, like a snap-hook or the like. Further, such deformable material may be stretched into the second position by the force resulting from the under-pressure.

According to a third aspect, there is provided a method for moving a hood, particularly a front hood, of a vehicle. The vehicle includes a frunk, a hood, particularly a front hood, at least one lifting means configured to lift the hood, and a deformable material. The hood is configured to close and seal the frunk in a closed position. The deformable material is attached to an inner surface of the hood. The method includes the following steps, not necessarily in the presented order:

starting lifting the hood and/or opening the frunk; and
switching the deformable material from a first position to a second position while lifting the hood.

The first position is a position, in which the deformable material is either flat or forms a dome being directed towards the inner surface of the hood. The second position is a position, in which the deformable material forms a dome being directed towards the frunk.

The method may be at least partly computer implemented, and may be implemented in software and/or in hardware. Further, the method may be carried out by computer program instructions running on means that provide data processing functions. The data processing means may be suitable computing means, such as an electronic control module etc., which may also be a distributed computer system. The data processing means or the computer, respectively, may include one or more of a processor, a memory, a data interface, or the like.

Thus, while lifting the hood, the deformable material switches into the second position and thereby reduces the under-pressure, which is created inside the frunk. By reducing the under-pressure, an opening speed of the hood is increased. The opening speed of the hood is important, particularly with regard to active safety systems for vehicles. Thus, the deformable material allows increasing a lifting speed, particularly reducing a time span needed to lift the hood into a predetermined lifted position.

It should be noted that any embodiment of the present disclosure may be combined with each other irrespective of the aspect involved. Accordingly, the method may be combined with structural features and, likewise, the hood lifting mechanism and/or the vehicle may be combined with features described above with regard to the method.

These and other aspects of the present disclosure will become apparent from and elucidated with reference to the embodiments described hereinafter.

BRIEF DESCRIPTION OF THE DRAWINGS

Exemplary embodiments of the disclosure will be described in the following with reference to the following drawings.

The figures are merely schematic representations and serve only to illustrate embodiments of the disclosure. Identical or equivalent elements are in principle provided with the same reference signs.

DESCRIPTION OF EMBODIMENTS

Figure 1:
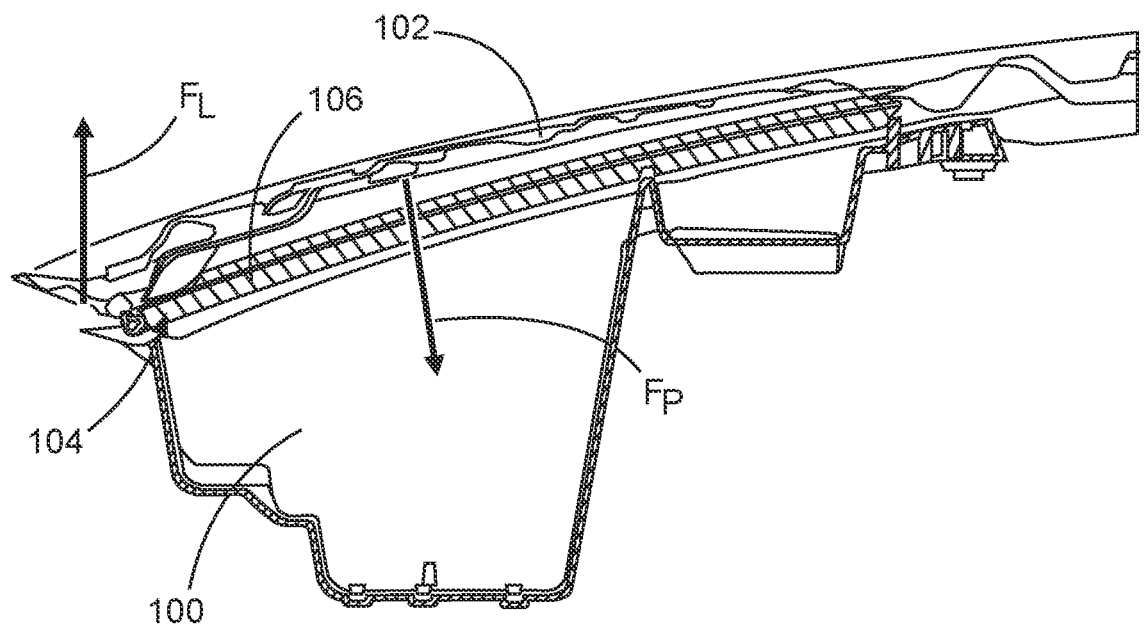
FIG. 1 shows a schematic cross-sectional view of an exemplary embodiment of a frunk and a front hood of a vehicle.

FIG. 1 shows a frunk (front trunk) 100 and a front hood 102 of a vehicle (not illustrated) in a schematic cross-sectional view. The frunk 100 is a compartment, which is closable by the front hood 102. When the frunk 100 is closed, that means, the front hood 102 is in a closed position, the front hood 102 contacts the frunk 100 in a contact area 104. The contact area 104 includes a sealing 106, which is configured to seal the contact area 104, thereby preventing the entry of dust, dirt, water, etc., into the frunk while the front hood 102 is in the closed position.

Figure 2:
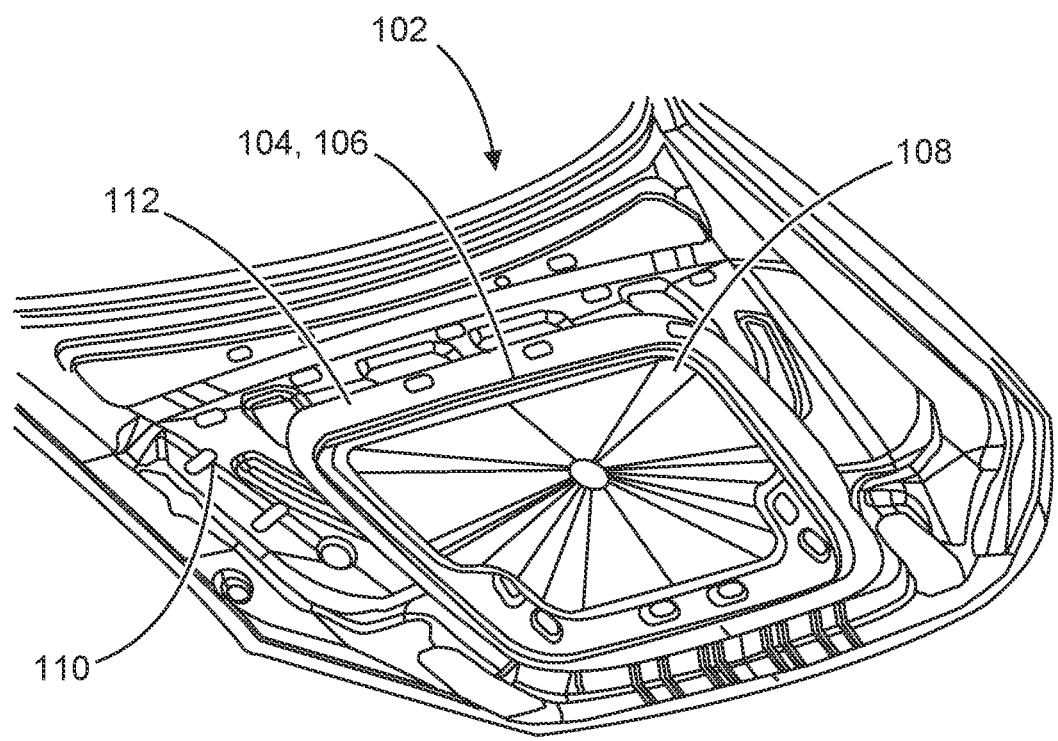
FIG. 2 shows a schematic view of an exemplary embodiment of a front hood illustrating an inner surface of the front hood.
Figure 3:
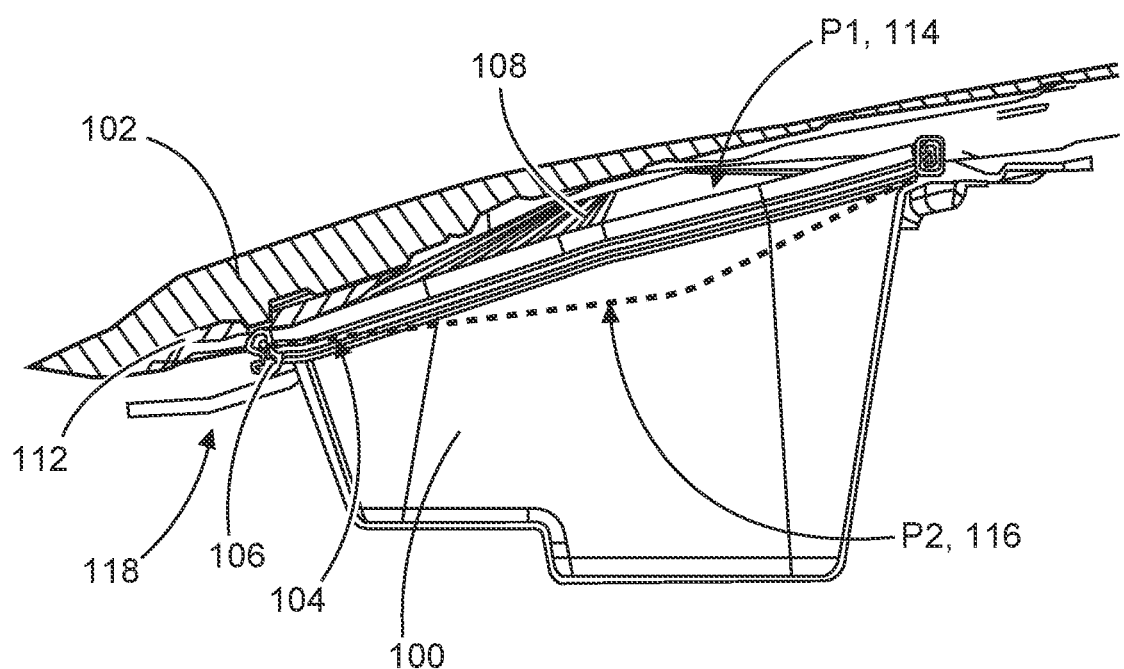
FIG. 3 shows a schematic partly cross-sectional view of an exemplary embodiment of a frunk and a front hood at which a deformable material is attached.

FIG. 2 shows the front hood 102, wherein a deformable material 108 is attached to an inner surface 110 of the front hood 102. The deformable material 108 is hold by a frame 112, which is attached to the inner surface 110 of the front hood 102. The frame 112 may be made of a light-weight and/or cost-efficient material, particularly plastic. Further, as shown in FIGS. 2 and 3, the sealing 106 is accommodated in the frame 112. The deformable material 108 is configured to switch between a first position P1 and a second position P2. In the first position P1, the deformable material 108 forms a dome 114 that is directed towards the inner surface 110. Alternatively, the deformable material 108 may be flat in the first position P1 (not illustrated).

In the second position P2 (see FIG. 3), the deformable material 108 forms a dome 116 that is directed towards the frunk 100. In other words, in the second position P2, the deformable material 108 protrudes into a volume of the frunk 100, thereby at least temporarily reducing the volume of the frunk 100.

Particularly, the deformable material 108 is part of a front hood lifting mechanism 118, which is configured to lift the front hood 102 upwards, such that the front hood 102 is spaced apart from the frunk 100. Further, the front hood lifting mechanism 118 may include at least one lifting means (not illustrated), particularly more than one lifting means. The lifting means may be provided at the frunk 100 and configured to initiate lifting the front hood 102 upwards such that the front hood 102 is spaced apart from the frunk 100. This means, the front hood 102 is not in contact with the frunk 100 anymore. The lifting means may be configured to generate a lifting force $F_L$ (see FIG. 1) upon activation allowing to lift the front hood 102 upwards very quickly.

In the closed position, the front hood 102 seals the frunk 100, and in particular, the sealing 106 attached to the frame 112 seals the contact area 104 between the front hood 102 and the frunk 100. Furthermore, the frunk 100 may include a sealing (not illustrated) configured to seal the frunk, when the hood is closed be being in contact with the sealing 106. Therefore, when lifting the front hood 102, an under-pressure is created inside the frunk 100 at least during an initial movement of the front hood 102. The initial movement describes a part of the lifting movement during which the sealing effect of sealing 106 is still active, and therefore, no air can enter the frunk 100. When the sealing effect stops, namely, when the sealing 106 has stopped sealing the contact area between the front hood 102 and the frunk 100, air can flow into the frunk, thereby eliminating the under-pressure.

The under-pressure causes a force $F_P$ (see FIG. 1) that pulls the front hood 102 downwards towards the frunk 100, and therefore, maintains the sealing effect of the sealing 106. Thus, air is prevented from entering the frunk 100. Furthermore, the under-pressure may cause the sealing 106 to get stuck against the inner surface 110 of the front hood 102 for longer, and therefore further delays the time before air starts entering the frunk 100. Consequently, the lifting of the front hood 102 is delayed.

As it can be seen in FIG. 3, the deformable material 108 is in the first position P1, when the front hood 102 is in the closed position. When the front hood 102 is lifted, the under-pressure, which is created during the initial movement of the front hood 102 causes the deformable material 108 to invert, namely to switch from the first position P1 into the second position P2 (illustrated by a dashed line), thereby reducing the volume inside the frunk 100. By reducing the volume inside the frunk 100, also the under-pressure is reduced. The reduced under-pressure results in a reduced force $F_P$ pulling the front hood 102 downwards, and therefore allows lifting the front hood 102 quicker to the pre-defined position. Additionally, or alternatively, the deformable material 108 may be coupled to a mechanism, e.g., an electronically controlled release mechanism, which may hold the deformable material in the first position P1, and may further be configured to switch the deformable material from the first position P1 into the second position P2. Such mechanism allows switching the deformable material with or without the presence of an under-pressure.

Figure 4:
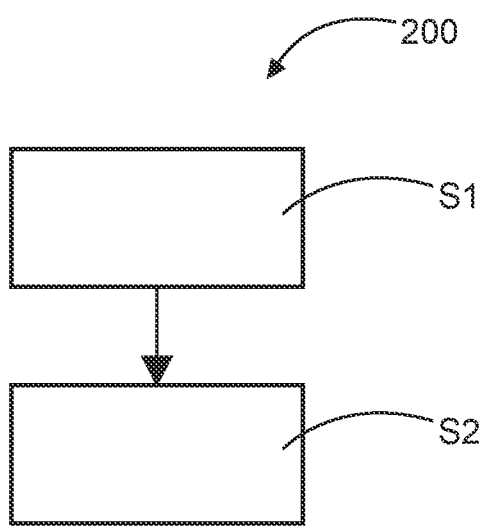
FIG. 4 shows a flowchart, schematically illustrating an exemplary embodiment of a method for moving a front hood of a vehicle.

FIG. 4 shows a flowchart, schematically illustrating a method 200 for moving a front hood 102 of a vehicle (not illustrated), wherein the vehicle includes a frunk 100, a front hood 102, and a deformable material 108. The front hood 102 is configured to close and seal the frunk 100 in a closed position, and the deformable material 108 is attached to an inner surface 108 of the front hood 102. The method 200 includes at least the following steps, not necessarily in this order:

step S1: initiating lifting the hood 102; and
step S2: switching the deformable material 108 from a first position P1, in which the deformable material 108 is either flat or forms a dome 114 being directed towards the inner surface 110 of the hood 102, to a second position P2, in which the deformable material 108 forms a dome 116 being directed towards the frunk 100, while lifting the hood 102.

Other variations to the any aspect of the present disclosure can be understood and effected by those skilled in the art in practicing the claimed disclosure, from the study of the drawings, the disclosure, and the appended claims. In the claims the word "comprising" does not exclude other elements or steps and the indefinite article "a" or "an" does not exclude a plurality. A single processor or other unit may fulfill the functions of several items or steps recited in the claims. The mere fact that certain measures are recited in mutually different dependent claims does not indicate that a combination of these measures cannot be used to advantage. A computer program may be stored/distributed on a suitable non-transitory computer-readable medium such as an optical storage medium or a solid-state medium supplied together with or as part of other hardware, but may also be distributed in other forms, such as via the Internet or other wired or wireless telecommunication systems. Any reference signs in the claims should not be construed as limiting the scope of the claims.

The invention claimed is:

1. A hood lifting mechanism for a vehicle having a frunk (100), the hood lifting mechanism comprising:
   at least one lifting means configured to lift a hood, and
   a deformable material configured to be attached to an inner surface of the hood,
   wherein the deformable material is configured to switch from a first position (P1) in which the deformable material is either flat or forms a dome being directed towards the inner surface of the hood into a second position (P2) in which the deformable material forms a dome being directed towards the frunk when the at least one lifting means is activated.

2. The lifting mechanism according to claim 1, wherein the at least one lifting means is configured to generate a force ($F_L$) for shooting the hood up.

3. The lifting mechanism according to claim 1, wherein the deformable material is attached to a frame, the frame being configured to be attached to the inner surface of the hood.

4. The lifting mechanism according to claim 1, wherein the deformable material is made of plastic, rubber and/or fabric.

5. The lifting mechanism according to claim 3, wherein the frame is made of plastic.

6. The lifting mechanism according to claim 1, wherein the deformable material is configured to deform elastically.

7. The lifting mechanism according to claim 1, wherein the deformable material (108) is configured to deform permanently.

8. A vehicle, comprising:
   a frunk,
   a hood configured to close and seal the frunk in a closed position,
   at least one lifting means configured to lift the hood, and
   a deformable material being attached to an inner surface of the of the hood,
   wherein the deformable material is configured to switch between a first position (P1) and a second position (P2), the first position (P1) being a position in which the deformable material is either flat or forms a dome being directed towards the inner surface of the hood and the second position (P2) being a position in which the deformable material forms a dome being directed towards the frunk.

9. The vehicle according to claim 8, wherein the at least one lifting means is configured to generate a force ($F_L$) for moving the hood up.

10. The vehicle according to claim 8, wherein the deformable material is attached to a frame being attached to the inner surface of the hood.

11. The vehicle according to claim 10, wherein the frame is made of plastic.

12. The vehicle according to claim 10, wherein the frame further comprises a sealing configured to seal a contact area between the hood and the frunk in the closed position.

13. The vehicle according to claim 8, wherein the deformable material is made of plastic, rubber and/or fabric.

14. A method for moving a hood of a vehicle, the method comprising:
   given a frunk, a hood configured to close and seal the frunk in a closed position, and
   a deformable material being attached to an inner surface of the hood, initiating lifting the hood, and
   switching the deformable material from a first position (P1) in which the deformable material is either flat or forms a dome being directed towards the inner surface of the hood to a second position (P2) in which the deformable material forms a dome being directed towards the frunk while lifting the hood.

* * * * *